(12) United States Patent
Phillips et al.

(10) Patent No.: US 6,558,290 B2
(45) Date of Patent: May 6, 2003

(54) METHOD FOR STOPPING AN ENGINE IN A PARALLEL HYBRID ELECTRIC VEHICLE

(75) Inventors: Anthony Mark Phillips, Northville, MI (US); Michael W. Degner, Farmington Hills, MI (US); Miroslava Jankovic, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/681,965

(22) Filed: Jun. 29, 2001

(65) Prior Publication Data

US 2003/0004031 A1 Jan. 2, 2003

(51) Int. Cl.$^7$ ............................................. B60K 41/02
(52) U.S. Cl. ................................ 477/5; 477/3; 180/65.2
(58) Field of Search .................... 477/3, 4, 5; 180/65.2, 180/65.6, 65.7

(56) References Cited

U.S. PATENT DOCUMENTS

| | | | |
|---|---|---|---|
| 5,343,970 A | | 9/1994 | Severinsky |
| 5,725,064 A | * | 3/1998 | Ibaraki et al. ............. 180/65.2 |
| 5,789,881 A | | 8/1998 | Egami et al. |
| 5,915,489 A | * | 6/1999 | Yamaguchi ................. 180/65.2 |
| 5,934,396 A | * | 8/1999 | Kurita ....................... 180/65.2 |
| 5,943,918 A | * | 8/1999 | Reed et al. .............. 192/219.5 |
| 5,993,351 A | | 11/1999 | Deguchi et al. |
| 6,067,801 A | | 5/2000 | Harada et al. |
| 6,083,139 A | | 7/2000 | Deguchi et al. |
| 6,135,920 A | * | 10/2000 | Kamiya et al. ............. 477/185 |
| 6,190,283 B1 | * | 2/2001 | Uchida .......................... 477/5 |
| 6,334,834 B1 | * | 1/2002 | Mizutani et al. ............. 477/203 |
| 6,352,489 B1 | * | 3/2002 | Kuroda et al. ................. 477/5 |

* cited by examiner

Primary Examiner—Rodney H. Bonck
Assistant Examiner—Dennis Abdelnour
(74) Attorney, Agent, or Firm—Brooks & Kushman; Carlos L. Hanze

(57) ABSTRACT

The invention provides a strategy to stop a parallel HEV powertrain engine while maintaining smooth vehicle response to driver demand using the motor while simultaneously opening an engine disconnect clutch. In the preferred embodiment, the strategy stops an engine (based on, for example, driver demand), disconnects the disconnect clutch to the powertrain, halts fuel to the engine, and predicts a desired motor/generator speed. The prediction of desired motor/generator speed can be: a trajectory comparison based on present and past vehicle velocity and deceleration or on a vehicle accelerator position, or a determination of whether the vehicle is in speed following control mode. The system can also add additional strategies such as accelerate the strategy if a vehicle brake is applied. The gradual takeover by the motor occurs by proportionally decreasing actual engine torque until engine torque is zero while maintaining vehicle velocity using for example a proportional plus integral controller.

33 Claims, 2 Drawing Sheets

METHOD FOR STOPPING AN ENGINE IN A PARALLEL HYBRID ELECTRIC VEHICLE

BACKGROUND OF INVENTION

1. Field of Invention

The present invention relates generally to a hybrid electric vehicle (HEV), and specifically to a strategy to stop an engine in an HEV with minimal torque disturbance to the powertrain.

2. Discussion of the Prior Art

The need to reduce fossil fuel consumption and pollutants from automobiles and other vehicles powered by internal combustion engines (ICEs) is well known. Vehicles powered by electric motors have attempted to address these needs. However, electric vehicles have limited range and limited power coupled with the substantial time needed to recharge their batteries. An alternative solution is to combine both an ICE and electric traction motor into one vehicle. Such vehicles are typically called hybrid electric vehicles (HEV's). See generally, U.S. Pat. No. 5,343,970 to Severinsky.

The HEV has been described in a variety of configurations. Some HEV patents disclose systems where an operator is required to select between electric and internal combustion operation. In other configurations the electric motor drives one set of wheels and the ICE drives a different set.

Other, more useful, configurations have developed. A series hybrid electric vehicle (SHEV) is a vehicle with an engine (most typically an ICE), which powers a generator. The generator, in turn, provides electricity for a battery and motor coupled to the drive wheels of the vehicle. There is no mechanical connection between the engine and the drive wheels. A parallel hybrid electrical vehicle (PHEV) is a vehicle with an engine (most typically an ICE), battery, and electric motor combined to provide torque to power the wheels of the vehicle.

A parallel/series hybrid electric vehicle (PSHEV) has characteristics of both the PHEV and the SHEV. The PSHEV is also known as a torque (or power) splitting powertrain configuration. Here, the torque output of the engine is given in part to the drive wheels and in part to an electrical generator. The generator powers a battery and motor that also provides torque output. In this configuration, torque output can come from either source or both simultaneously. The vehicle braking system can even deliver torque to drive the generator to produce charge to the battery (regenerative braking).

The desirability of combining the ICE with an electric motor is clear. The ICE's fuel consumption and pollutants are reduced with no appreciable loss of performance or vehicle range. A major benefit of parallel HEV configurations is that the engine can be turned off during periods of low or no power demand from the driver (e.g., waiting for a traffic light). This improves fuel economy by eliminating wasted fuel used during idle conditions. The motor can then propel the vehicle under conditions of low power demand. In some configurations, the engine can be disconnected from the motor and powertrain when it is not running by opening a disconnect clutch. As power demand increases, the engine can be restarted and reconnected to provide the requested torque.

Developing a strategy to stop an HEV engine and transfer primary torque production of the powertrain from the engine to the motor or to set the vehicle to idle conditions with minimal torque disturbance is needed for successful implementation of a parallel HEV. If the engine is connected to the powertrain, stopping the engine would involve maintaining the vehicle's response to the driver's demand using the motor while simultaneously opening a clutch that connects the engine to the powertrain (disconnect clutch) and stopping the engine. Torque supply to the powertrain should be transferred from the engine to the motor smoothly in order to avoid any disturbance to the driver.

Strategies to turn off an HEV's engine are known in the prior art. See generally, U.S. Pat. No. 5,789,881 to Egami et al., U.S. Pat. No. 5,993,351 to Deguchi et al., U.S. Pat. No. 6,067,801 to Harada et al., and U.S. Pat. No. 6,083,139 to Deguchi et al. Unfortunately, no simple and cost sensitive strategy is known to stop a parallel HEV engine while maintaining a smooth vehicle response to driver demand using the motor while simultaneously opening a clutch that connects the engine to the powertrain (disconnect clutch).

SUMMARY OF INVENTION

Accordingly, the present invention provides a strategy to stop a parallel HEV engine while maintaining a smooth vehicle response to driver demand using the motor while simultaneously opening a clutch that connects the engine to the powertrain. In the preferred embodiment, the HEV powertrain has an engine, a motor/generator, a power transfer unit (such as an automatic transmission, planetary gear set, or an electronic converterless transmission), and an engine disconnect clutch.

The strategy stops the engine (based on, for example, driver demand) by predicting and commanding a desired motor/generator speed, halting fuel to the engine, and opening the disconnect clutch to the powertrain. Next the strategy calculates a desired motor/generator torque.

The prediction of a desired motor/generator speed can be a trajectory comparison based on, for example, vehicle velocity and deceleration at a present time and at some past time or on a vehicle acceleration controller (such as an accelerator or brake) position. Predicting the desired motor/generator speed can also include a determination of whether the vehicle is in speed following control mode.

The system can also add additional strategies such as a termination strategy if the acceleration control is applied aggressively.

Other objects of the present invention will become more apparent to persons having ordinary skill in the art to which the present invention pertains from the following description taken in conjunction with the accompanying figures.

BRIEF DESCRIPTION OF DRAWINGS

The foregoing objects, advantages, and features, as well as other objects and advantages, will become apparent with reference to the description and figures below, in which like numerals represent like elements and in which.

DETAILED DESCRIPTION

The present invention generally relates to hybrid electric vehicles (HEVs). Although the preferred embodiment described is for a parallel HEV, the invention could be applied to any vehicle using a motor and an engine as the drive source having an engine disconnect clutch.

Figure 1:
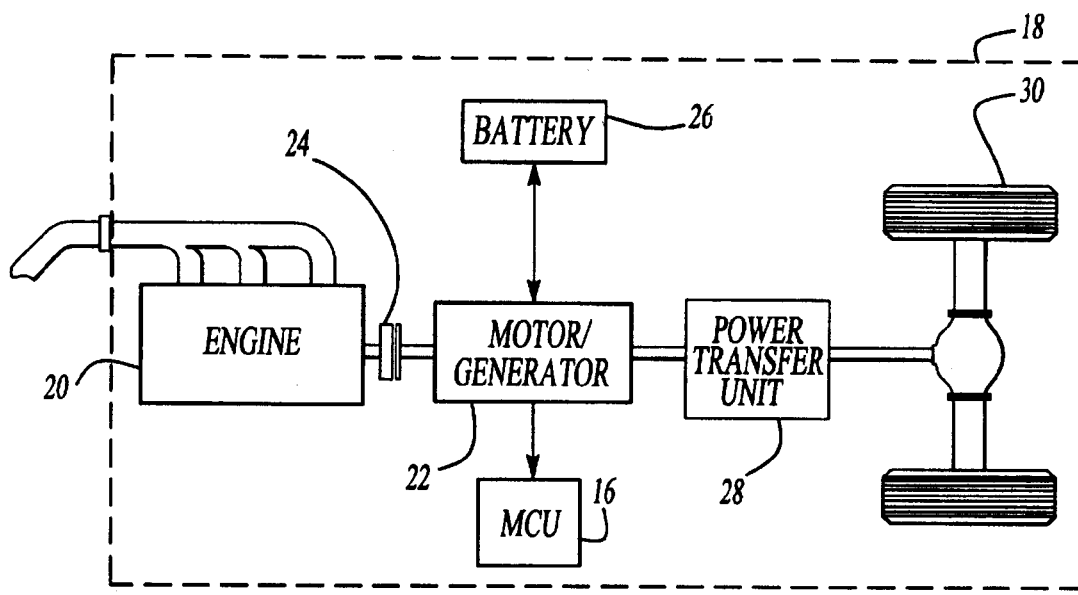
FIG. 1 shows a general parallel hybrid electric vehicle configuration with an engine disconnect clutch.

FIG. 1 shows general components of a parallel HEV powertrain with an engine disconnect clutch. An engine 20, is linked to a motor/generator 22, via a disconnect clutch 24. The powertrain has a vehicle system controller (VSC) 18, and the motor/generator 22 has an additional motor control unit and inverter (MCU) 16. A battery 26 connects to the motor/generator 22 to allow the flow of electrical current to and from the two components. The motor/generator 22 is connected to a powertrain power transfer unit 28 (such as an automatic transmission, a planetary gear set (power-split), or an electronic converterless transmission), that is connected to the vehicle's wheels 30. Thus, torque and energy flow from the engine 20 and motor/generator 22 through the power transfer unit 28 to the wheels 30.

In this configuration, both the engine 20 and the motor/generator 22 can be directly coupled to the wheels 30, so that both power sources can independently provide torque to the vehicle powertrain. The configuration shown in FIG. 1 employs the disconnect clutch 24 between the engine 20 and the motor/generator 22 to allow a temporary disconnection of the engine 20 from the motor/generator 22 and the wheels 30. The motor, in addition to propelling the vehicle, can also be operated as a generator for use in charging the battery 26 using the engine 20 or through regenerative braking. Regenerative braking uses the motor/generator 22 to recover vehicle braking energy to charge the battery.

Figure 2:
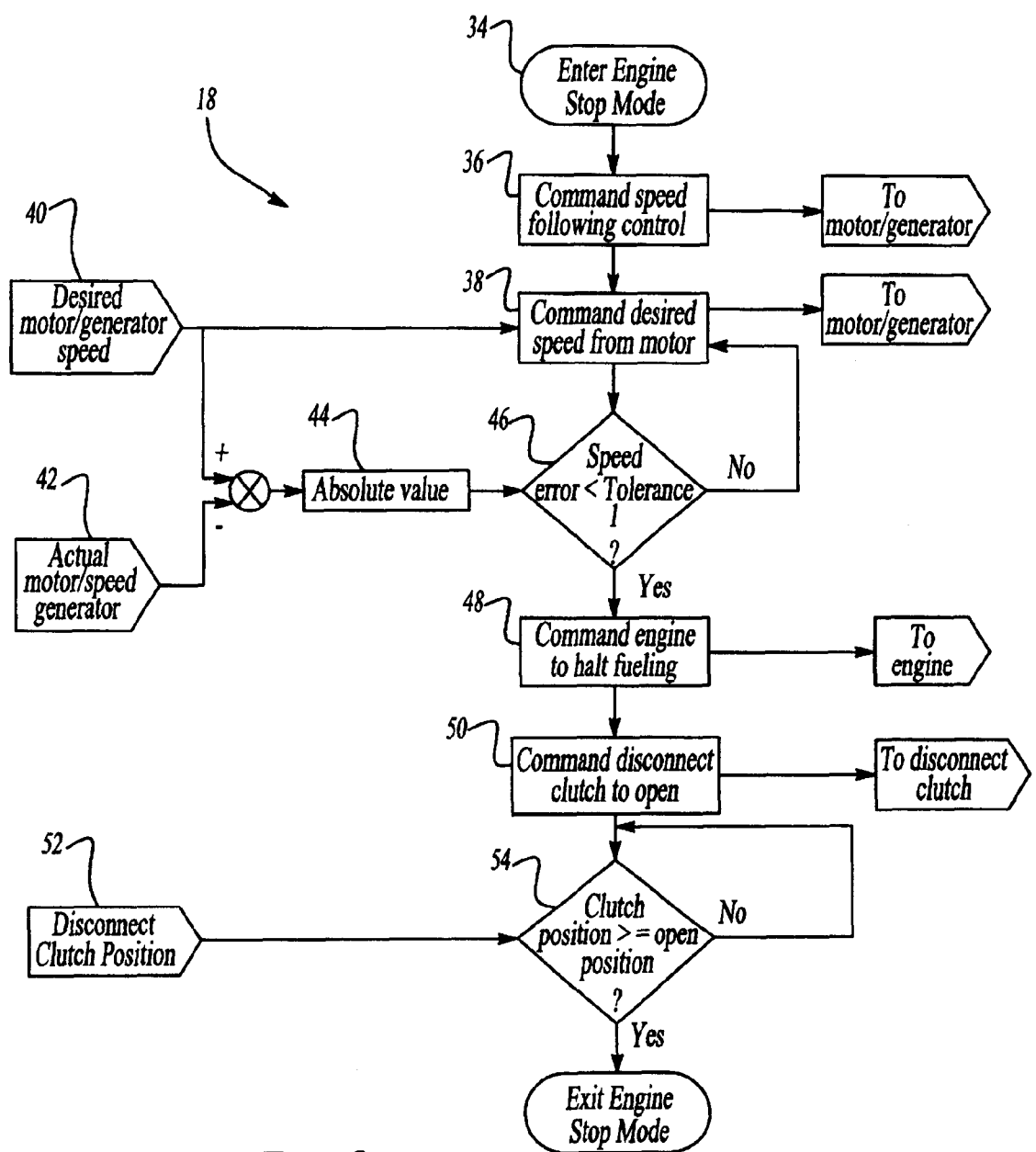
FIG. 2 shows the strategy of the present invention to stop the engine and smoothly disconnect the engine from the vehicle powertrain.

The present invention is a strategy to stop a parallel HEV engine, while maintaining a smooth vehicle response to driver demand or other vehicle conditions, using the motor/generator 22 and simultaneously opening the disconnect clutch 24 that connects the engine 20 to the vehicle powertrain. The preferred embodiment of the strategy of the present invention is illustrated in FIG. 2. It is noteworthy at the outset that the strategy can be configured to accelerate completion at any point if a vehicle brake system is applied (such as when a brake pedal is depressed) or abort at any point if vehicle acceleration control is aggressively applied (not shown).

FIG. 2 shows the preferred strategy for stopping the engine 20 in an HEV parallel powertrain configuration. Initially, the motor/generator 22 is commanded to be in speed following control mode. At the same time, a desired angular speed command is also sent to the motor/generator 22. If the power transfer unit 28 is engaged, the desired motor/generator 22 angular speed ($\omega_{mot\_des}$) is calculated according to:

$$\omega_{mot\_des}[v(t_0)+((v(t_0)-v(t_0-T))/T)*kT]*C.$$

In this formula: "$v(t_0)$" is the vehicle speed when an engine stop mode 34 is entered (i.e., at time="$t_0$"); "T" is a sample time between measurements of vehicle speed; "k" is a number of measurement sample intervals since $t_0$; and "C" is the kinematic conversion factor from vehicle speed to motor/generator angular speed and can include wheel radius, final drive ratio, and gear ratio. The constant "C" converts linear vehicle speed at the wheels to angular motor/generator speed. This method effectively uses the vehicle's velocity and acceleration at the beginning of the engine stop event to estimate the vehicle's velocity at some future time ($t_0$)+kT.

Though not shown here, an alternative algorithm for calculating the desired speed trajectory could utilize a map from accelerator or brake position to desired vehicle speed, which could then be translated to desired motor/generator speed.

In general, the strategy compares actual vehicle speed (as translated to motor/generator speed) to the desired value once the motor/generator 22 is under speed control. When the speed error falls below a calibratable tolerance (Tolerance 1), the strategy directs the vehicle system controller (VSC) 18 to halt fuel to the engine 20 and the controller commands the disconnect clutch 24 to open. Although not shown in the flowchart, the speed error could also be required to stay below the calibratable tolerance for a fixed amount of time in order to guarantee that the speed control has stabilized the system at the desired speed.

While the engine 20 is decelerating, it could still impart an undesirable torque on the vehicle powertrain if the disconnect clutch 24 is even partially closed. Therefore the shutdown strategy does not end until the disconnect clutch 24 is completely open. Since the motor/generator 22 is in speed following control mode during the engine stopping strategy, the strategy compensates for any torque disturbances caused by the engine 20 by modifying its torque output in order to maintain the vehicle at the desired speed. In FIG. 2, a disconnect clutch position sensor 52 is shown as the measurement signal used for determining whether or not the clutch is still partially closed. Other signals (e.g., clutch apply pressure) could also be used for this purpose.

During the entire engine stopping strategy of the present invention, a vehicle braking system status (such as brake position) can be monitored for any changes. At any point when the vehicle brakes are applied, the engine stopping strategy can be accelerated by immediately halting fuel to the engine 20 and commanding the disconnect clutch 24 to open completely. The engine stop strategy is then immediately exited to one of several alternative vehicle states, depending on the vehicle operating status.

Specifically, FIG. 2 illustrates a preferred embodiment of the present invention. The strategy begins with a command from an engine controller such as the vehicle system controller (VSC) 18 to enter the engine stop mode at Step 34. Initially, the motor/generator 22 is commanded to run in speed following control mode in Step 36 (as opposed to torque following mode). During speed following control mode, the motor/generator applies whatever torque is necessary to achieve a desired speed set point. On the other hand, in torque following mode, the motor/generator tries to achieve the desired torque set point, allowing the speed to change. The motor/generator 22 remains in speed following control mode until the disconnect clutch 24 is fully open. Next, a desired angular speed command is also sent to the motor/generator 22 at Step 38 based on the desired motor/generator speed 40 described above.

After the command for desired motor/generator 22 speed is sent in Step 38, an actual motor/generator speed 42 is received by a vehicle sensor and is compared to the desired motor/generator speed 40 at Step 44 to produce an motor/generator speed error. The strategy then determines whether an absolute value of the actual motor/generator speed 42 error falls below a calibratable tolerance (Tolerance I) at Step 46. If the speed error is not below Tolerance 1 at Step 46, the strategy returns to Step 38. If the speed error is below Tolerance 1 at Step 46, the strategy directs the VSC 18 to halt fueling the engine 20 at Step 48 based on its own separate stopping strategy and then commands the disconnect clutch 24 to open at Step 50.

As the strategy proceeds, the disconnect clutch 24 disengages over a calibratable period of time. The engine 20 speed will begin to decrease. Since the motor/generator 22 is in speed following control mode, it will continue to apply whatever torque is necessary (within its capability) to maintain the desired vehicle speed.

The prediction of a desired motor/generator speed can be a trajectory comparison based on, for example, vehicle velocity and deceleration at a present time and at some past time or on a vehicle acceleration controller (such as an accelerator or brake) position. Predicting the desired motor/generator 22 speed can also include a determination of whether the vehicle is in speed following control mode.

The motor/generator gradually takes over the necessary torque to propel the vehicle by proportionally decreasing the actual engine torque in Step 48 and Step 50 until engine 20 torque is zero while maintaining vehicle velocity using, for example, a proportional plus integral controller.

At Step 54 the strategy determines whether the disconnect clutch 24 is disengaged from the vehicle powertrain from a disconnect clutch position sensor 52. If the disconnect clutch 24 is disengaged, the strategy continues. When the disconnect clutch position sensor 52 indicates it is disengaged from the powertrain the strategy ends.

Figure 3:
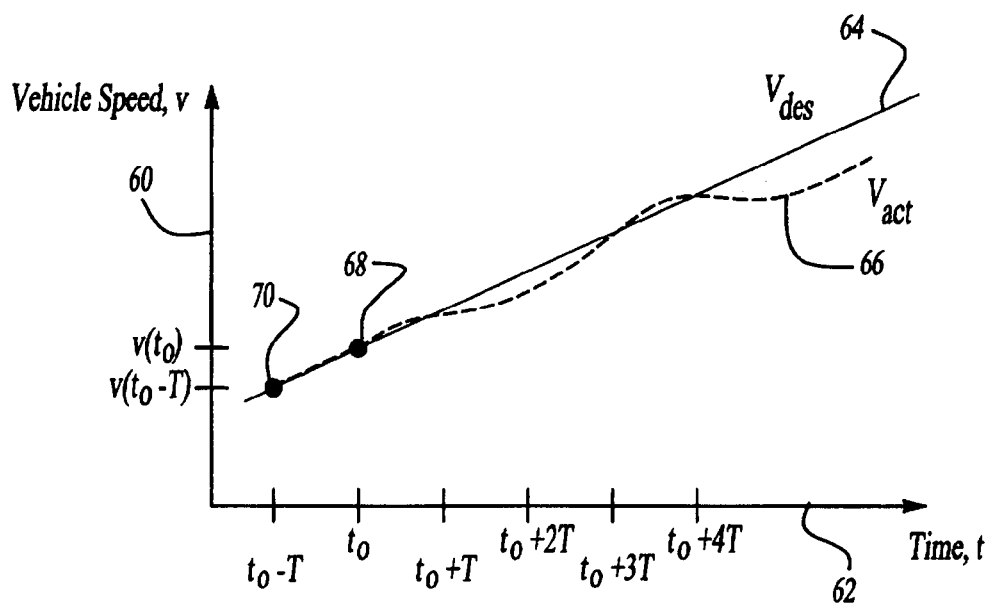
FIG. 3 shows vehicle speed over time for desired and actual vehicle speed.

FIG. 3 shows vehicle speed (velocity) 60 (Y-axis) over time 62 (X-axis) for desired vehicle speed 64 and actual vehicle speed 66. Desired vehicle speed 64 can be calculated using vehicle speed and acceleration at the beginning of the engine stop event 68 and vehicle speed and acceleration at some past time 70 to estimate the vehicle's velocity at some future time.

An alternative strategy for calculating the desired speed trajectory shown in FIG. 3 could instead utilize a map from accelerator or brake position to predict desired vehicle speed, which could then be translated to desired motor/generator speed. As stated above for any implementation, the vehicle brake system status (such as brake position) can still be monitored for any changes so that the overall strategy can be accelerated if the brake is applied.

The above-described embodiment of the invention is provided purely for purposes of example. Many other variations, modifications, and applications of the invention may be made.

What is claimed is:

1. A system to stop an engine in a vehicle, the system comprising:
   a motor/generator;
   a power transfer unit;
   a vehicle powertrain connecting the engine, the motor/generator, and the power transfer unit;
   a disconnect clutch for connecting the engine to, and disconnecting the engine from, the motor/generator; and
   a vehicle system controller, the vehicle system controller being configured to determine a desired motor/generator speed, and to determine when to stop the engine based in part on the desired motor/generator speed.

2. The system of claim 1, wherein the vehicle system controller is configured to determine the desired motor/generator speed at least partly based on a trajectory comparison of vehicle velocity and acceleration at a present time and at some past time.

3. The system of claim 1, wherein the vehicle system controller is configured to determine the desired motor/generator speed at least partly based on a vehicle accelerator position.

4. The system of claim 1, wherein the vehicle system controller is configured to determine the desired motor/generator speed at least partly based on a vehicle brake position.

5. The system of claim 1, wherein the vehicle system controller is further configured to determine whether the motor/generator is in speed following control mode.

6. The system of claim 1 wherein the power transfer unit is an automatic transmission.

7. The system of claim 1 wherein the power transfer unit is a planetary gear set.

8. The system of claim 1 wherein the power transfer unit is an electronic converterless transmission.

9. The system of claim 1, wherein the vehicle system controller is further configured to compare a speed error to a calibratable tolerance, the speed error being the difference between an actual motor/generator speed and the desired motor/generator speed.

10. The system of claim 9, wherein the vehicle system controller is further configured to signal the disconnect clutch to disconnect the engine from the motor/generator when the speed error is below a calibratable tolerance.

11. The system of claim 9, wherein the vehicle system controller is further configured to signal the engine to halt fueling when the speed error is below a calibratable tolerance.

12. The system of claim 1, wherein the vehicle system controller is further configured to signal the disconnect clutch to disconnect the engine from the motor/generator when a vehicle brake is applied.

13. The system of claim 1, wherein the vehicle system controller is further configured to signal the engine to halt fueling when a vehicle brake is applied.

14. A method of stopping an engine in a vehicle, the vehicle including a motor/generator, the method comprising:
   determining a desired motor/generator speed;
   operating the motor/generator based on the desired motor/generator speed;
   determining an actual motor/generator speed;
   comparing the desired motor/generator speed to the actual motor/generator speed to determine a speed error;
   comparing the speed error to a calibratable tolerance;
   halting fueling of the engine when the speed error is below the calibratable tolerance; and
   opening a clutch when the speed error is below the calibratable tolerance, the clutch being configured to at least connect the engine to, and disconnect the engine from, the motor/generator.

15. The method of claim 14, wherein the actual motor/generator speed is a function of vehicle speed.

16. The method of claim 14, wherein the desired motor/generator speed is a function of vehicle speed when engine stopping begins and vehicle speed at a past time.

17. The method of claim 14, wherein the desired motor/generator speed is a function of accelerator pedal position.

18. The method of claim 14, wherein the desired motor/generator speed is a function of brake pedal position.

19. The method of claim 14, wherein the halting fueling of the engine only occurs when the speed error remains below the calibratable tolerance for a fixed time.

20. The method of claim 14, wherein the opening of the clutch only occurs when the speed error remains below the calibratable tolerance for a fixed time.

21. The method of claim 14, further comprising halting fueling of the engine when a vehicle brake is applied.

22. The method of claim 14, further comprising opening the clutch when a vehicle brake is applied.

23. A method of stopping an engine in a vehicle, the vehicle including a vehicle system controller, a motor, and a clutch connecting the engine to the motor, the method comprising:
   entering an engine stop mode based on a command from the vehicle system controller;

determining a desired motor/generator speed;

sending a speed command to the motor/generator based on the desired motor speed;

determining an actual motor/generator speed;

comparing the desired motor/generator speed to the actual motor/generator speed to determine a speed error;

comparing the speed error to a calibratable tolerance;

halting fueling of the engine when the speed error is below the calibratable tolerance;

opening the clutch when the speed error is below the calibratable tolerance;

determining whether the clutch is fully open; and exiting the engine stop mode when it is determined that the clutch is fully open.

24. The method of claim 23, wherein the actual motor/generator speed is a function of vehicle speed.

25. The method of claim 23, wherein the desired motor/generator speed is a function of vehicle speed when the engine stop mode is entered and vehicle speed at a past time.

26. The method of claim 23, wherein the desired motor/generator speed is a function of accelerator pedal position.

27. The method of claim 23, wherein the desired motor/generator speed is a function of brake pedal position.

28. The method of claim 23, wherein the halting fueling of the engine only occurs when the speed error remains below the calibratable tolerance for a fixed time.

29. The method of claim 23, wherein the opening of the clutch only occurs when the speed error remains below the calibratable tolerance for a fixed time.

30. The method of claim 23, further comprising halting fueling of the engine when a vehicle brake is applied.

31. The method of claim 23, further comprising opening the clutch when a vehicle brake is applied.

32. The method of claim 23, wherein determining whether the clutch is fully open comprises using a clutch position sensor.

33. The method of claim 23, wherein determining whether the clutch is fully open comprises using clutch apply pressure.

* * * * *